Patented May 12, 1931

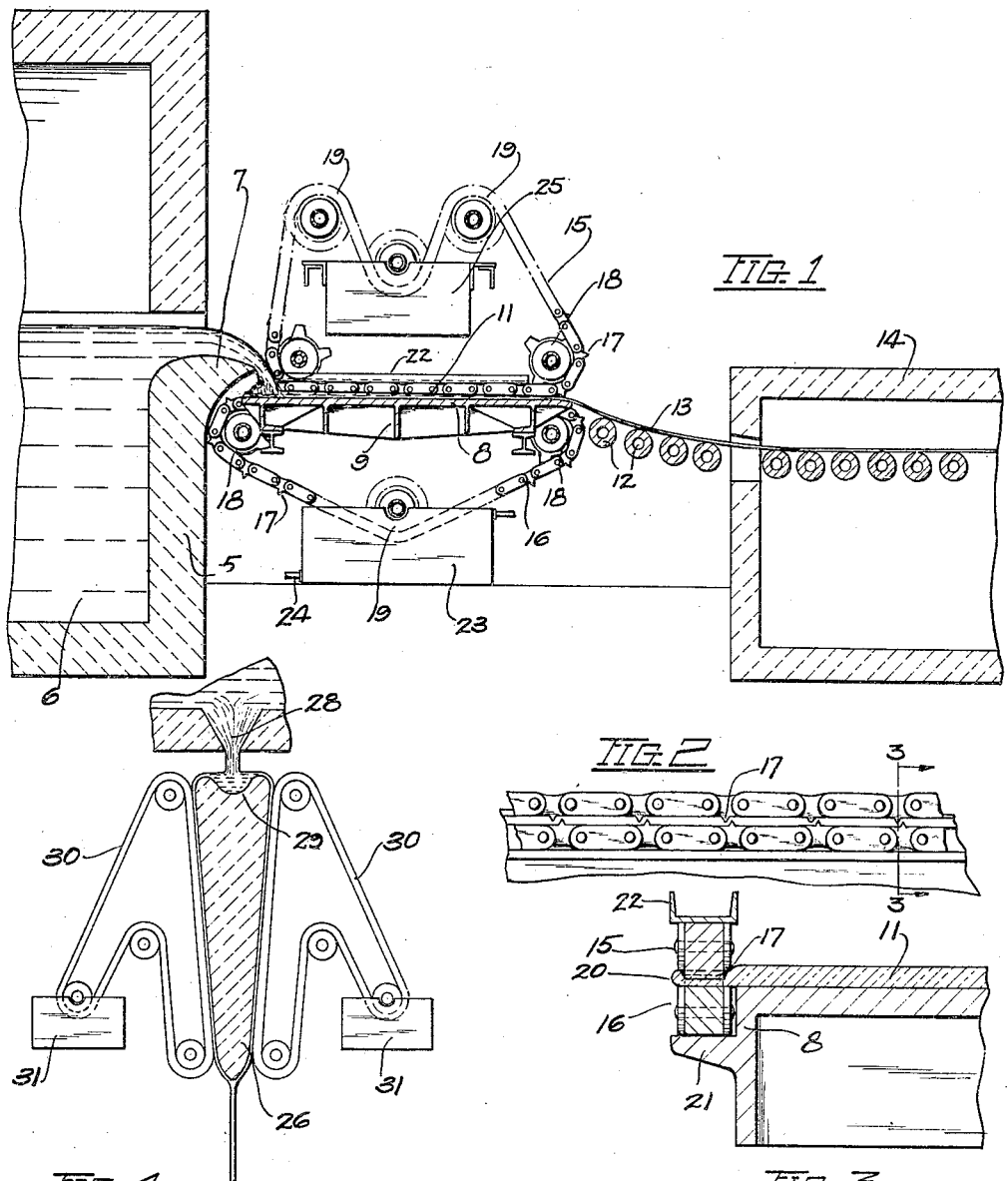

1,805,250

UNITED STATES PATENT OFFICE

LEOPOLD MAMBOURG, OF LANCASTER, OHIO, ASSIGNOR TO LIBBEY-OWENS-FORD GLASS COMPANY, OF TOLEDO, OHIO, A CORPORATION OF OHIO

SHEET WIDTH MAINTAINING DEVICE

Application filed November 5, 1926. Serial No. 146,318.

The present invention relates to sheet width maintaining device.

An important object of the invention is to provide in sheet glass apparatus means whereby a mass of glass is moved bodily over a surface, and including means whereby the edges of the body of glass are engaged to prevent narrowing of said body.

Another object of the invention is to provide in sheet glass apparatus means for causing a flow of molten glass over a slab, and edge engaging means contacting with the flow edges to prevent narrowing of said flow.

A still further object of the invention is to provide in sheet glass apparatus means for passing a film of glass over a slab, and providing cooperating edge engaging means to prevent narrowing of the film, and then drawing a sheet from said film.

A further object of the invention is to provide a device of this nature wherein molten glass is flowed over a slab in a manner that cooperating chain devices can contact with the edges thereof to insure a uniform width of flow, and then producing a sheet therefrom.

Another object of the invention is to provide a slab, and means for flowing a mass of molten glass over the slab, the mass extending over the edges of said slab, the overhanging parts of the flow being gripped and carried by cooperating devices adapted to maintain a constant and uniform width.

Other objects and advantages of the invention will become more apparent during the course of the following description.

In the drawings wherein like numerals are employed to designate like parts throughout the same, Fig. 1 is a vertical longitudinal section through one form of apparatus employing my invention, Fig. 2 is a fragmentary detail of the edge engaging means, Fig. 3 is a section on line 3—3 in Fig. 2, Fig. 4 is a sectional view of a slightly modified form of construction, and Fig. 5 is a modified form of the slab shown in Fig. 1.

The present invention relates particularly to the formation of a sheet of glass by flowing molten glass over a slab and removing the molten glass from one end thereof in sheet form. In Fig. 1 the numeral 5 designates a tank furnace containing a mass of molten glass 6, permitted to flow from the tank over a discharge lip 7. Arranged in a preferably lower horizontal plane than the discharge lip 7 is a preferably metallic slab 8. The slab 8 is preferably formed from a noncorrosive metal such as nichrome, chromium plated metals, stellite, etc., which may or may not be highly polished, as desired. Heat radiating fins or bracing members 9 may be employed, while either heating or cooling means may be applied to the under-surface of said slab 8. The slab is illustrated in Fig. 1 as being arranged in a horizontal plane, but of course it can be inclined if desired to accelerate the flow of molten glass thereover. The numeral 10 designates the body of glass passing from the tank furnace 5 to the slab 8 where it spreads out and flows thereover in film or sheet formation 11. The width of the lip 7 is preferably slightly greater than the width of the slab 8 so that there will be a small overhang of glass along both edges. The numeral 12 designates conveyor rolls adapted to convey the sheet 13 from the end of the slab 8 to the annealing leer 14.

To insure a constant and uniform width of sheet cooperating edge engaging means 15 and 16 respectively are provided. The engaging means 15 and 16 are preferably chain devices formed from a plurality of pivotally associated links, the links carrying thereon projections or prongs 17, as illustrated clearly in Fig. 2. The arrangement of the projections 17 may be varied to suit the individual operators. In operation, the chain devices are trained over the sprockets 18 and 19 respectively. The sprockets 18, as shown in Fig. 1, are provided to permit the chain to be run adjacent the edges of the slab 8, shown in Fig. 3. As shown in Fig. 3, the film 11 is being moved over the slab 8, while the edges of the film 20 overhang and are engaged by the chains 15 and 16. A supporting member 21 is provided for the lower chain in its horizontal run, while a bearing shaft 22 may be provided for the upper chain. The bearing surface 22 is adjustable to permit of the engagement of any desired thickness of edge 20.

The numeral 23 designates a receptacle through which the chain passes over the sprocket 19, the receptacle containing a suitable cooling medium to prevent overheating of said chain, while the cooling medium may be continuously changed by means of the conduits 24. Arranged above the slab is a second receptacle 25 through which the belt passes to be cooled as in the case of the receptacle 23.

In Fig. 4 is shown a modified construction wherein a slab 26 is arranged substantially in a vertical plane in a manner that a film of glass may be flowed down both sides thereof, uniting at the end of the slab and being drawn away into sheet form designated by the numeral 27. In this case the molten glass 28 is deposited in a recess 29 formed in the top of the slab, the recess overflowing in a manner to produce the film formation flowing down the sides of said slab.

The chain devices 30 are used in a slightly different manner than in the case of the construction in Fig. 1. As shown, a single chain is provided at the edge of each film so that the borders of the films are pressed between the chains 30 and the slab itself. By using these devices, uniform widths of films will be flowed down the slab 26, producing a constantly uniform width of sheet 27. Cooling receptacles 31 are provided and arranged to permit the chain devices or edge engaging means to be passed therethrough.

In Fig. 5 is shown a modified construction of the slab 8 illustrated in Fig. 1, wherein it is provided with a chamber 32. The temperature of the slab may then be controlled by either heating or cooling the chamber 32 as desired.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, a slab, means for flowing glass thereon, and means contacting with the edges of the flow while on said slab and moving therewith to prevent narrowing thereof.

2. In sheet glass apparatus, a slab, means for flowing molten glass thereon, the edges of said flow overhanging the edges of the slab and means engaging said overhanging edges to prevent narrowing of the flow of glass.

3. In sheet glass apparatus, a slab, means for flowing molten glass thereon, the edges of said flow overhanging the edges of the slab, and means engaging and moving with said overhanging edges to prevent narrowing of the flow of glass.

4. In sheet glass apparatus, a slab, means for flowing molten glass thereon, and means for gripping the flow of glass at its edges while still on said slab and movable therewith to prevent narrowing thereof.

5. In sheet glass apparatus, a slab, means for flowing molten glass thereon, and cooperating chain devices engageable with the flow edges to prevent narrowing thereof.

6. In sheet glass apparatus, a slab, means for flowing molten glass thereon, cooperating chain devices engageable with the flow edges to prevent narrowing thereof, and means for controlling the temperature of said chain devices.

7. In sheet glass apparatus, a slab, means for flowing glass thereon, and movable means at the sides of said slab engaging said flow for preventing narrowing thereof.

8. In sheet glass apparatus, a slab, means for flowing glass thereon, and movable means for receiving the edges of the flow of glass therebetween while on the slab and engaging opposite sides thereof to prevent narrowing of said flow.

9. In sheet glass apparatus, a slab, means for flowing glass thereon, and movable means contacting with the edges of the flow of glass on the slab and throughout substantially the entire length of said slab to prevent narrowing of the flow of glass.

Signed at Toledo, in the county of Lucas and State of Ohio, this 2nd day of November 1926.

LEOPOLD MAMBOURG.